(12) United States Patent
Tsuchiya et al.

(10) Patent No.: US 8,255,406 B2
(45) Date of Patent: Aug. 28, 2012

(54) DATA MANAGEMENT USING MULTI-STATE BLOOM FILTER

(75) Inventors: Yoshihiro Tsuchiya, Kawasaki (JP); Yasuo Noguchi, Kawasaki (JP); Takashi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/028,409

(22) Filed: Feb. 16, 2011

(65) Prior Publication Data

US 2011/0225182 A1 Sep. 15, 2011

(30) Foreign Application Priority Data

Mar. 10, 2010 (JP) ................................ 2010-053795

(51) Int. Cl.
*G06F 17/30* (2006.01)
(52) U.S. Cl. ....................................... 707/754; 707/758
(58) Field of Classification Search .................. 707/802, 707/812, 754, 758
See application file for complete search history.

(56) References Cited

U.S. PATENT DOCUMENTS

| | | | | |
|---|---|---|---|---|
| 5,990,810 A * | 11/1999 | Williams | ........................ | 341/51 |
| 2010/0318795 A1 * | 12/2010 | Haddad et al. | ................ | 713/168 |
| 2011/0004639 A1 * | 1/2011 | Williams | ....................... | 707/812 |
| 2011/0087779 A1 * | 4/2011 | Martin et al. | .................. | 709/224 |
| 2011/0099187 A1 * | 4/2011 | Hansen | .......................... | 707/769 |
| 2011/0225191 A1 * | 9/2011 | Xie | ................................ | 707/775 |
| 2012/0011150 A1 * | 1/2012 | Swaminathan et al. | ....... | 707/770 |

FOREIGN PATENT DOCUMENTS

JP 2007-52698 3/2007

OTHER PUBLICATIONS

Adam Lavitt Kirsch, Hashed-Based Data Structures for Extreme Conditions, May 2008.*

* cited by examiner

*Primary Examiner* — Son T Hoang
(74) *Attorney, Agent, or Firm* — Staas & Halsey LLP

(57) ABSTRACT

A data management device includes a memory including a multistage Bloom Filter, a first stage being divided into filter parts of which the number is same as that of data blocks, and a pth stage being divided into filter parts of which a size is a combination of filter parts of a (p−1)th stage; a registration unit registering an entry of data in a filter part of the first stage corresponding to a data block where the data is stored, and the entry of the data to a filter part of the pth stage corresponding to the filter part of the first stage where the entry of the data is registered; and a search unit determining which filter part of the first stage an entry of data being searched is registered in by narrowing down filter parts from the Bloom Filter of which a stage number is large.

2 Claims, 11 Drawing Sheets

FIG. 5

| DATA | HASH VALUE | REMAINDER WHEN DIVIDED BY 1024 | REMAINDER WHEN DIVIDED BY 2048 | REMAINDER WHEN DIVIDED BY 4096 |
|---|---|---|---|---|
| | 1234567 | 647 | 1671 | 1671 |
| | 3984012 | 652 | 652 | 2700 |
| | 9803323 | 571 | 1595 | 1595 |

FIG. 8

| DATA | HASH VALUE | REMAINDER WHEN DIVIDED BY 1024 | REMAINDER WHEN DIVIDED BY 2048 | REMAINDER WHEN DIVIDED BY 4096 |
|---|---|---|---|---|
| | 8324797 | 701 | 1725 | 1725 |
| | 5890831 | 783 | 783 | 783 |
| | 3980339 | 51 | 1075 | 3123 |

DATA MANAGEMENT USING MULTI-STATE BLOOM FILTER

CROSS-REFERENCE TO RELATED APPLICATION

This application is based upon and claims the benefit of priority of the prior Japanese Patent Application No. 2010-053795, filed on Mar. 10, 2010, the entire contents of which are incorporated herein by reference.

FIELD

A certain aspect of the embodiments discussed herein is related to a data management device and a data management method.

BACKGROUND

Conventionally, when managing large volume data with a tree structure, a B-tree data structure is relatively often used. As a B-tree stores multiple data entries (hereinafter, referred to as entries) in one block, it has an advantage in that the range affected by the change of the form of the tree structure becomes small when an entry is added, compared to a simple binary tree. Thus, a B-tree is often used as a data management method for disks such as hard disks.

However, when searching data managed on the disk with a tree structure, it is necessary to read multiple data blocks. Moreover, as the speed of I/O (input/output) to the disk is generally slower than that of the memory access, it may take time and trouble to search data on the disk. Therefore, recently, there has been considered of a method of having a tree structure in a memory to prevent the delay of search caused by the disk I/O. However, in a B-tree, when the number of entries increases, the amount of necessary memory may increase in response to the increase of the number of entries. Thus, a method of using a method of storing the part which is most frequently read in the tree structure to the memory (cache) has been considered.

Recently, there has been known a data structure which is called a Bloom Filter. The Bloom Filter is a method of examining whether a certain entry belongs to an existing set efficiently, as disclosed in Japanese Patent Application Publication No. 2007-52698 for example.

SUMMARY

According to an aspect of the present invention, there is provided a data management device including: a storage unit that includes data blocks and stores data on one of the data blocks; a hash generation unit that generates a hash value of the data; a memory that includes a multistage Bloom Filter, a first stage of the multistage Bloom Filter being divided into filter parts of which the number is same as the number of the data blocks, and a pth stage (p is an integer equal to or larger than 2) being divided into filter parts of which a size is a combination of filter parts of a (p−1)th stage; a registration unit that registers an entry of the data in each stage of the multistage Bloom Filter by using the hash value of the data; and a search unit that determines whether there is a possibility that an entry of data to be searched is registered in each filter part of the multistage Bloom Filter by using a hash value of the data to be searched generated by the hash generation unit; wherein the registration unit registers the entry of the data in a filter part of a Bloom Filter at the first stage corresponding to a data block where the data is stored, and registers the entry of the data in a filter part of a Bloom Filter at the pth stage corresponding to the filter part of the Bloom Filter at the first stage in which the entry of the data is registered, and the search unit determines which filter part of the Bloom Filter at the first stage the entry of the data to be searched is registered in by narrowing down filter parts from the Bloom Filter of which a stage number is large.

The object and advantages of the invention will be realized and attained by means of the elements and combinations particularly pointed out in the claims.

It is to be understood that both the foregoing general description and the following detailed description are and explanatory and are not restrictive of the invention, as claimed.

BRIEF DESCRIPTION OF DRAWINGS

FIG. 5 is a diagram indicating hash values of data to be registered and remainders calculated by dividing hash values by 1024, 2048 and 4096;

FIG. 8 is a diagram indicating hash values of data to be searched and remainders calculated by dividing hash values by 1024, 2048 and 4096;

DESCRIPTION OF EMBODIMENTS

As described previously, as a B-tree can handle large amount of data, it is possible to reduce the number of times of disk I/O if cache is implemented properly. However, it is not possible to reduce the number of times of disk I/O more than a certain level. Moreover, when the tree structure changes because of the addition of entry, the I/O may be necessary for managing the tree structure. In addition, as a Bloom Filter only tells the presence of entry, it is not possible to use a Bloom Filter for data management without any change.

A description will now be given of an exemplary embodiment of a data management device and a data management method with reference to FIG. 1 through FIG. 10.

Figure 1:
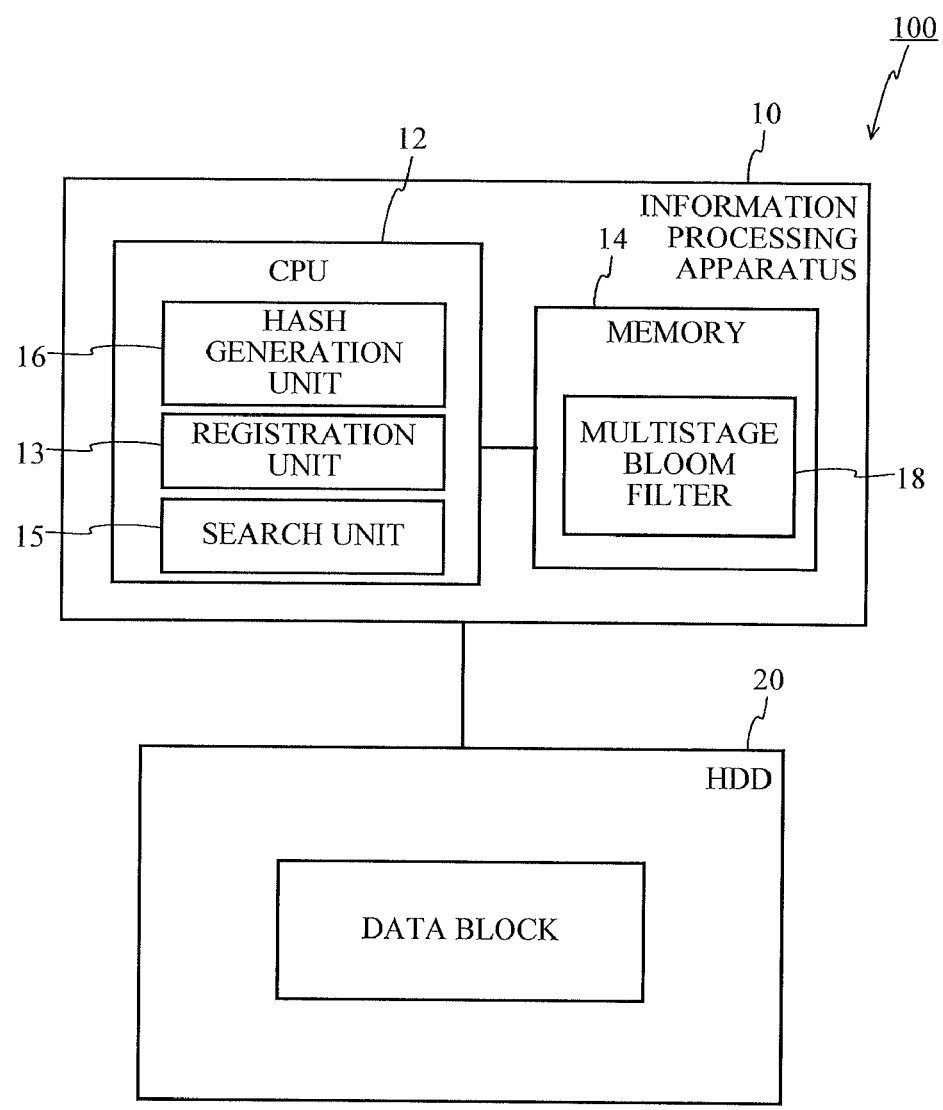
FIG. 1 is a block diagram illustrating a composition of an information processing system in accordance with an exemplary embodiment schematically.

FIG. 1 illustrates a block diagram of a schematic composition of an information processing system 100 as a data management device. As illustrated in FIG. 1, the information processing system 100 is provided with an information processing apparatus 10, and a magnetic recording apparatus (HDD (Hard disk drive)) 20 as a storage unit.

The information processing apparatus 10 includes a CPU (Central Processing Unit) 12 and a memory 14. The CPU 12 controls the I/O in the HDD 20, manages data stored in the HDD 20, and the like. The CPU 12 includes a hash generation unit 16, a registration unit 13, and a search unit 15 as illustrated in FIG. 1. The hash generation unit 16 generates k hash values. The registration unit 13 registers an entry of data stored in the HDD 20 in the memory 14 with the hash values generated by the hash generation unit 16. The search unit 15 searches a data entry stored in the HDD 20 on the memory 14 with the hash values generated by the hash generation unit 16. The memory 14 is composed of a RAM (Random Access Memory), and includes a multistage Bloom Filter 18. The entry of data recorded in a data block of the HDD 20 is registered in the multistage Bloom Filter 18.

Figure 2:
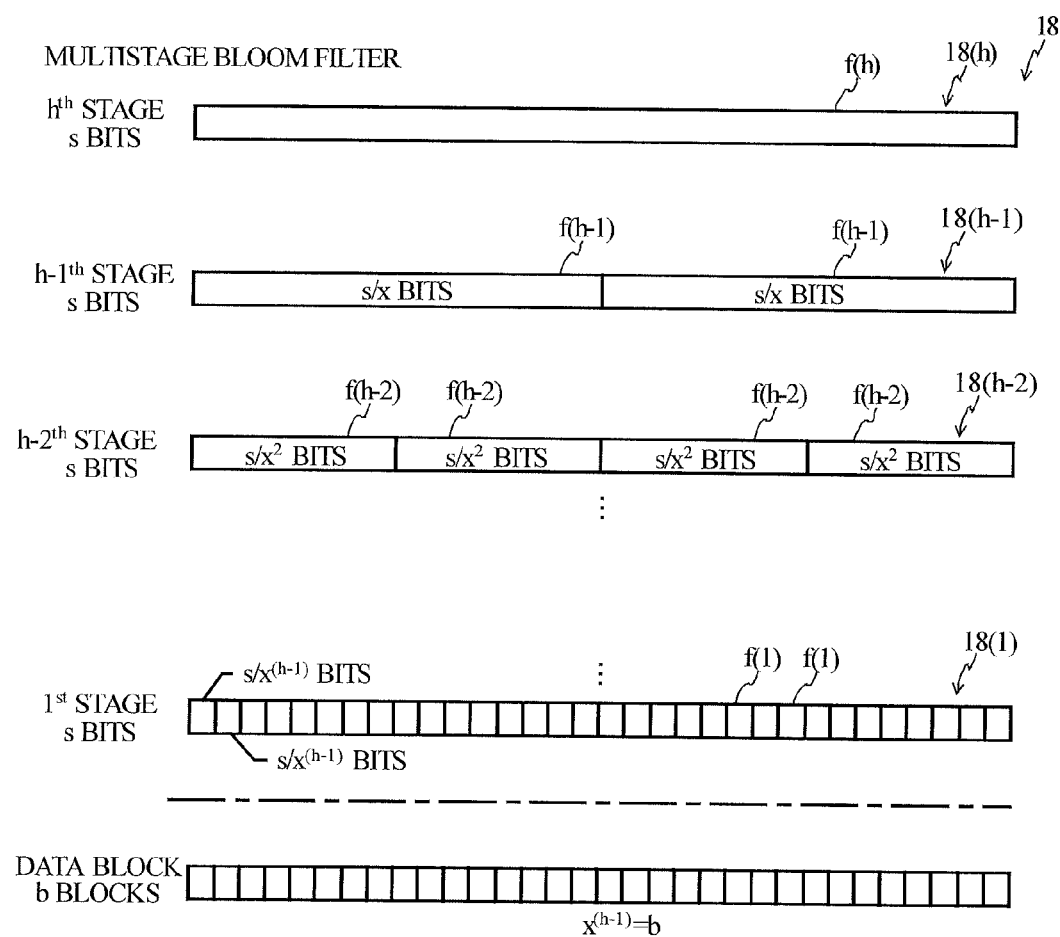
FIG. 2 is a diagram for explaining a structure of a multistage Bloom Filter and a role of a multistage Bloom Filter.

The HDD 20 includes a number of data blocks (here, b data blocks) on a hard disk as a storage medium (see a lowest part in FIG. 2). Each data block has a capacity which stores m fixed-length data, and data is added to any one of data blocks. That is to say that in this exemplary embodiment, it is possible to store up to n entries on the hard disk of the HDD 20 (n=m×b). The operation of the HDD 20 is controlled by the CPU 12, and the CPU 12 controls the block number (i) where data is being currently recorded of b data blocks. Moreover, the CPU 12 controls an offset (j) where data was recorded last in the data block. The data stored in the HDD 20 is not limited to fixed-length data, and may be undefined-length data.

FIG. 2 is a diagram for explaining the composition and the role of the multistage Bloom Filter 18. As illustrated in FIG. 2, the multistage Bloom Filter 18 is an h-stage Bloom Filter, and the amount of memory of the Bloom Filter at each stage is s bits. In this case the whole amount of memory of the multistage Bloom Filter 18 becomes h×s bits.

In the h-stage Bloom Filter, the Bloom Filter 18($h$) at a top stage (an hth stage) registers all of n data entries. That is to say, the Bloom Filter 18($h$) at the hth stage includes a filter part f(h) where all the data entries are registered.

The Bloom Filter 18(h−1) at an (h−1)th stage includes x filter parts f(h−1) which are divided into s/x bits (x=2 in FIG. 2). A group which is made by dividing b data blocks of the HDD 20 into x equal parts corresponds to each of s/x-bit filter parts f(h−1), and each filter part f(h−1) has a role to register n/x entries.

The Bloom Filter 18(h−2) at an (h−2)th stage includes $x^2$ filter parts f(h−2) which are divided into s/$x^2$ bits. A group made by dividing b data blocks of the HDD 20 into $x^2$ equal parts corresponds to each of s/$x^2$-bit filter parts f(h−2), and each filter part f(h−2) has a role to register n/$x^2$ entries.

In other words, in this exemplary embodiment, the Bloom Filter 18($p$) at a pth stage (p is an integer equal to or larger than 2) is divided into filter parts of which the size is the combination of filter parts (here, two filter parts) of the Bloom Filter 18(p−1) at a (p−1)th stage.

The Bloom Filter 18(1) at the lowest stage (the 1st stage) is divided in the same manner, and especially the Bloom Filter 18(1) at the 1st stage includes b filter parts f(1) divided into s/b bits. That is to say that the number of filter parts of the Bloom Filter at the 1st stage is set to the same number as that of data blocks. A group made by dividing b data blocks of the HDD 20 into b equal parts (each data block) corresponds to each of s/b-bit filter parts f(1), and each filter part f(1) has a role to register n/b entries. A following formula (1) expresses b.

$$b = x^{(h-1)} \quad (1)$$

In the above description, it is supposed that there is an integer h which meets above formula (1). However, the above description does not limit the present invention. When an integer h does not exist, the value of x which is used at each stage may be other values for example. The point is that the number of filter parts f(1) of the Bloom Filter at the 1st stage becomes b consequently.

Figure 3:
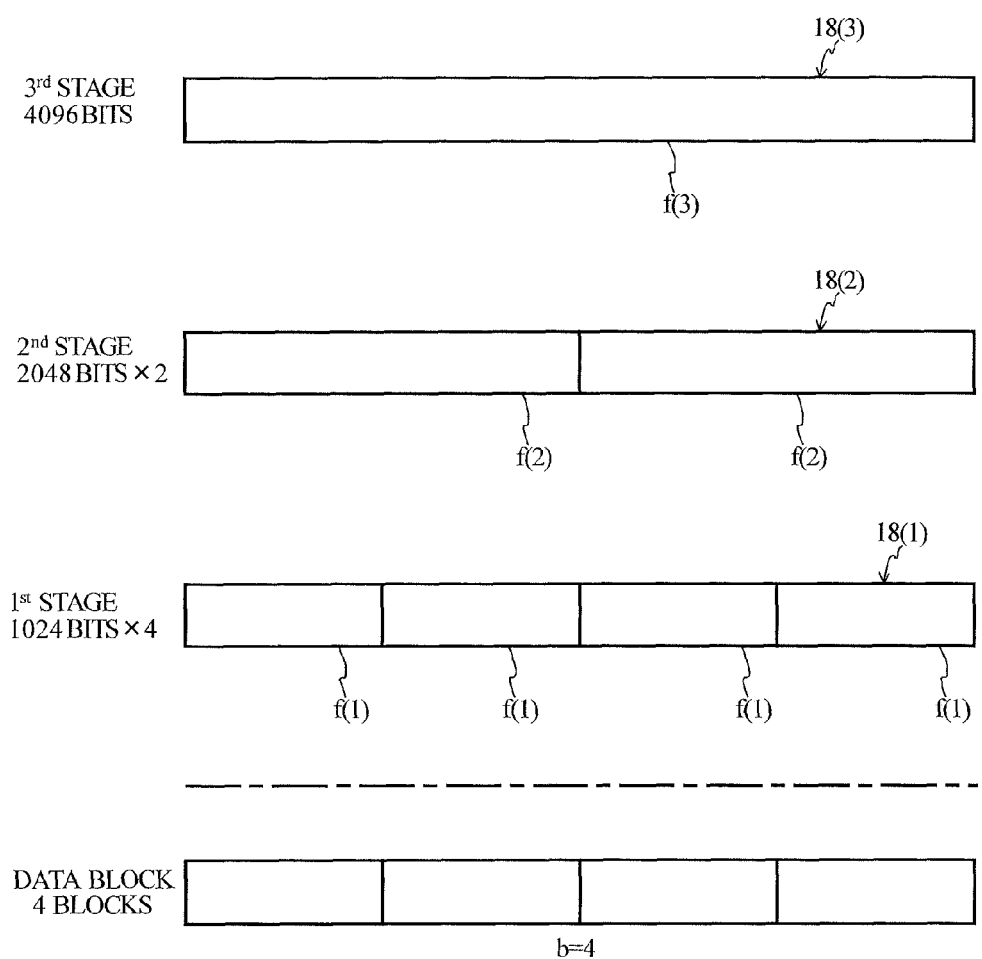
FIG. 3 is a diagram illustrating a multistage Bloom Filter schematically.

FIG. 3 is a diagram illustrating the multistage Bloom Filter 18 schematically to make a description simple. In FIG. 3, the multistage Bloom Filter 18 is a three-stage Bloom Filter. The Bloom Filter 18(1) at the 1st stage includes filter parts f(1) of which the number is same as the number of data blocks (four data blocks). The Bloom Filter 18(2) at the 2nd stage includes two filter parts f(2), each size of which is equal to the combination of two filter parts f(1) of the Bloom Filter 18(1) at the 1st stage. The Bloom Filter 18(3) at the 3rd stage includes a filter part f(3) of which the size is equal to the combination of two filter parts f(2) of the Bloom Filter 18(2) at the 2nd stage. In FIG. 3, the filter part f(1) is 1024 bits, the filter part f(2) is 2048 bits, and the filter part f(3) is 4096 bits.

A description will now be given, with reference to FIG. 4 through FIG. 10, of methods of managing data (a method of registering data (entry) and a method of a search of data (entry)) in the information processing system 100 in accordance with the exemplary embodiment by using a case in FIG. 3 as an example.

(A Method of Registering Data (Entry))

A description will now be given of a method of registering data (entry) along a flowchart in FIG. 4 and other diagrams. Assume that data is input to the HDD 20 but is not deleted from the HDD 20 in this process.

Figure 4:
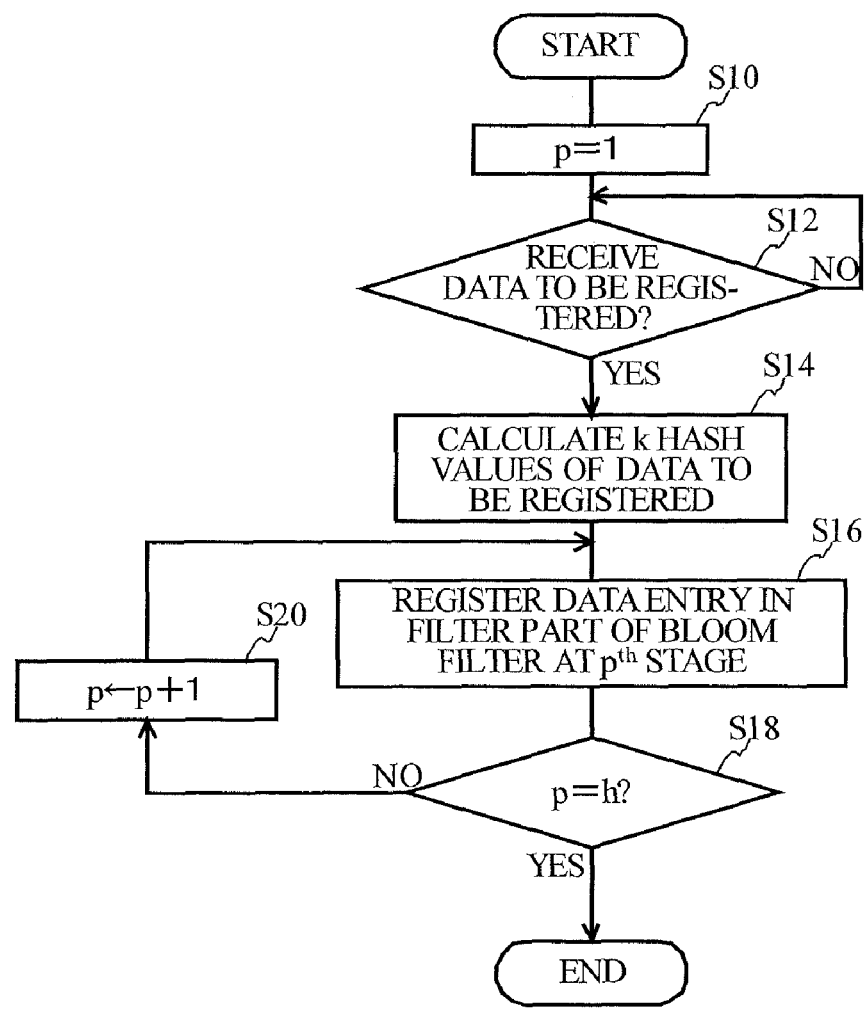
FIG. 4 is a flowchart illustrating a process of registering data.

In FIG. 4, the registration unit 13 of the CPU 12 sets the parameter p indicating the stage number to 1 in a step S10. Then, the registration unit 13 determines whether it receives data to be registered, which means that it determines whether data entry exists, in a step S12. When the determination of the step S12 is YES, the hash generation unit 16 calculates k hash values of the data to be registered in a step S14. In this exemplary embodiment, the hash generation unit 16 calculates three hash values for one data (that is k=3). Here, as illustrated in a table in FIG. 5, "1234567", "3984012" and "9803323" are calculated as hash values of data to be registered for example.

Figure 6:
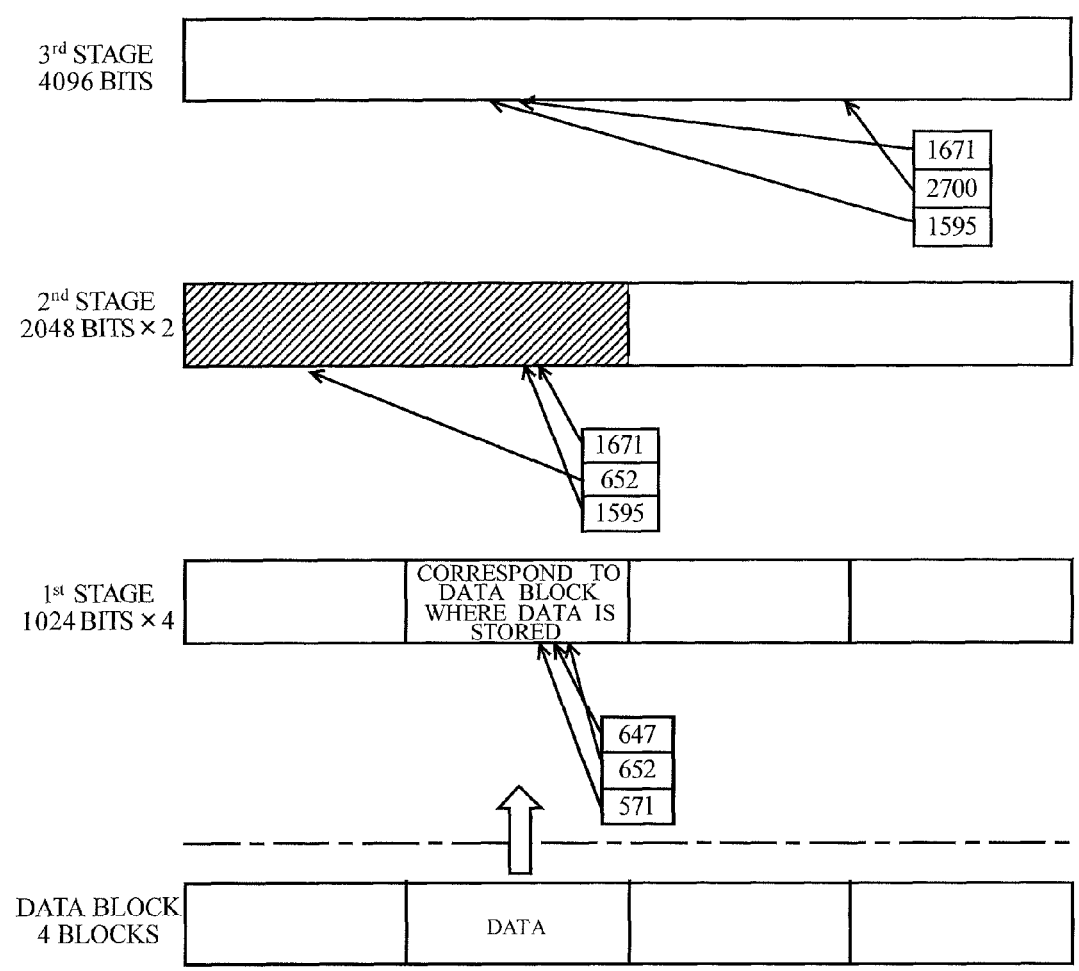
FIG. 6 is a diagram for explaining a process of registering data.

Back to FIG. 4, the registration unit 13 registers data entry in the Bloom Filter at the 1st stage by using k (here, three) hash values in a step S16. More specifically, the registration unit 13 uses the amount of memory (1024 bits) of each filter part f(1) of the Bloom Filter at the 1st stage and calculates remainders by dividing three hash values by 1024. Then, the registration unit 13 registers calculated remainders "647", "652" and "571" in the filter part corresponding to the data block where data to be registered is stored as illustrated in FIG. 5. The registration in this case is carried out by turning 647th bit, 652nd bit and 571st bit of 1024 bits of the corresponding filter part ON. The Bloom Filter f(1) at the 1st stage in FIG. 6 illustrates the state where the entry of data to be registered is registered in the filter part of the Bloom Filter.

The registration unit 13 determines whether p is h (here, h=3) in a step S18. That is to say that the registration unit 13 determines whether it registered data to be registered in from the Bloom Filter at the lowest stage through the Bloom Filter at the top stage. When the determination of the step S18 is NO, the process moves to a step S20. The registration unit 13 increments p by one (p<-p+1, that is p<-2) in the step S20, and goes back to the step S16.

In the step S16, the registration unit 13 registers data entry in the Bloom Filter at the pth stage (here, the 2nd stage). In this case, the registration unit 13 uses the amount of memory (2048 bits) of the filter part f(2) of the Bloom Filter 18(2) at the 2nd stage, and calculates remainders by dividing three hash values by 2048. Then, the registration unit 13 registers calculated remainders "1671", "652" and "1595" indicated in FIG. 5 in the filter part f(2) of the Bloom Filter 19(2) at the 2nd stage corresponding to the filter part f(1) of the Bloom Filter 18(1) at the 1st stage where the data is stored. Here, "the filter part f(2) corresponding to the filter part f(1) where the data is registered" means the filter part f(2) located right above the filter part f(1) where the data is registered (the filter part f(2) illustrated with hatching in FIG. 6). In this registration, 1671st bit, 652nd bit and 1595th bit of 2048 bits of the filter part f(2) illustrated with hatching are turned ON.

In the step S18, the registration unit 13 determines whether p is h (here, h=3). When the determination of the step S18 is NO, the process moves to the step S20. The registration unit 13 increments p by one (p<-p+1, that is p<-3) in the step S20 and goes back to the step S16.

In the step S16, the registration unit 13 registers data entry in the Bloom Filter 18(3) at the pth stage (here, the 3rd stage). In this case, the registration unit 13 uses the amount of memory (4096 bits) of the filter part f(3) of the Bloom Filter 18(3) at the 3rd stage, and calculates remainders by dividing three hash values by 4096. Then, the registration unit 13 registers calculated remainders "1671", "2700" and "1595" in the filter part f(3) of the Bloom Filter 18(3) at the 3rd stage corresponding to the filter parts of Bloom Filters 18(1) and 18(2) at the 1st and 2nd stages where the data is registered. In this registration, 1671st bit, 2700th bit and 1595th bit of 4096 bits of the filter part f(3) are turned ON. The Bloom Filter 18(3) at the 3rd stage in FIG. 6 illustrates the state where the entry of data to be registered is registered in the filter part f(3) of the Bloom Filter.

As described above, when the procedure of the step S16 ends, as the determination of the step S18 becomes YES, the whole process of registering data to be registered in FIG. 4 is ended.

(A Method of a Search of Data (Entry))

A description will now be given of a method of a search of data (entry) along a flowchart in FIG. 7 and other diagrams.

Figure 7:
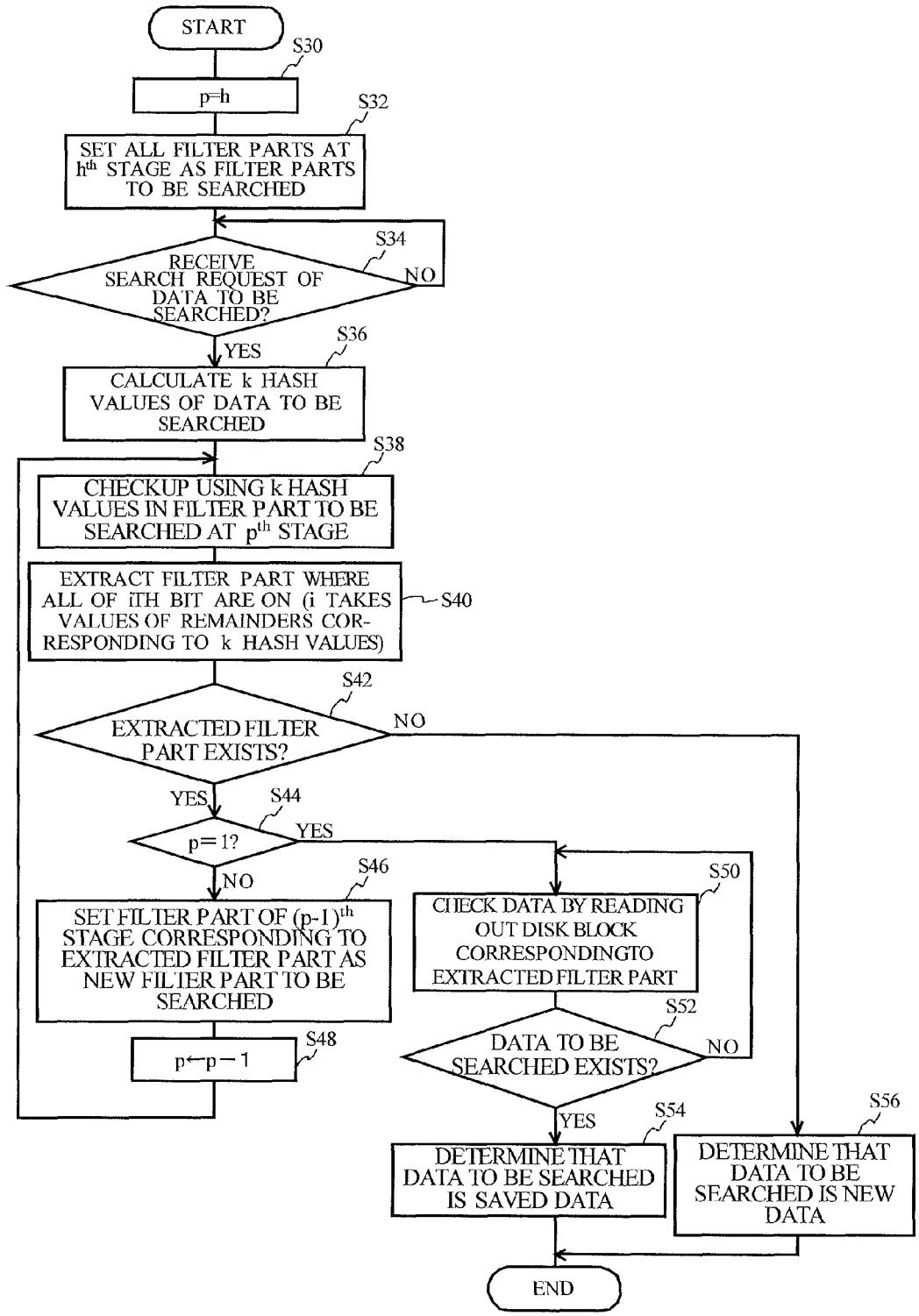
FIG. 7 is a flowchart illustrating a process of a search of data.

In the flowchart in FIG. 7, the search unit 15 of the CPU 12 sets the parameter p indicating the stage number to h (here, h=3) in a step S39. Then, in a step S32, the search unit 15 sets all the filter parts of the Bloom Filter at the hth stage as filter parts to be searched. In this exemplary embodiment, the filter part f(3) of the Bloom Filter 18(3) at the 3rd stage in FIG. 3 is set as the filter part to be searched.

The search unit 15 determines whether it receives a search request of data to be searched in a step S34. When the determination of the step S34 is YES, the process moves to the step S36, and the hash generation unit 16 calculates k (here, three) hash values of data to be searched. In this exemplary embodiment, assume that three hash values "8324797", "5890831" and "3980339" are calculated as illustrated in FIG. 8.

In the step S38, the search unit 15 carries out a checkup using k hash values in the filter part to be searched at the pth stage (the 3rd stage). In this checkup, the search unit 15 calculates remainders "1725", "783" and "3123" by dividing hash values by the number of bits (4096) at the 3rd stage in the same manner as the registration as illustrated in FIG. 8. Then, the search unit 15 determines whether 1725th, 783rd and 3123rd bits are ON in the filter part to be searched.

Figure 9:
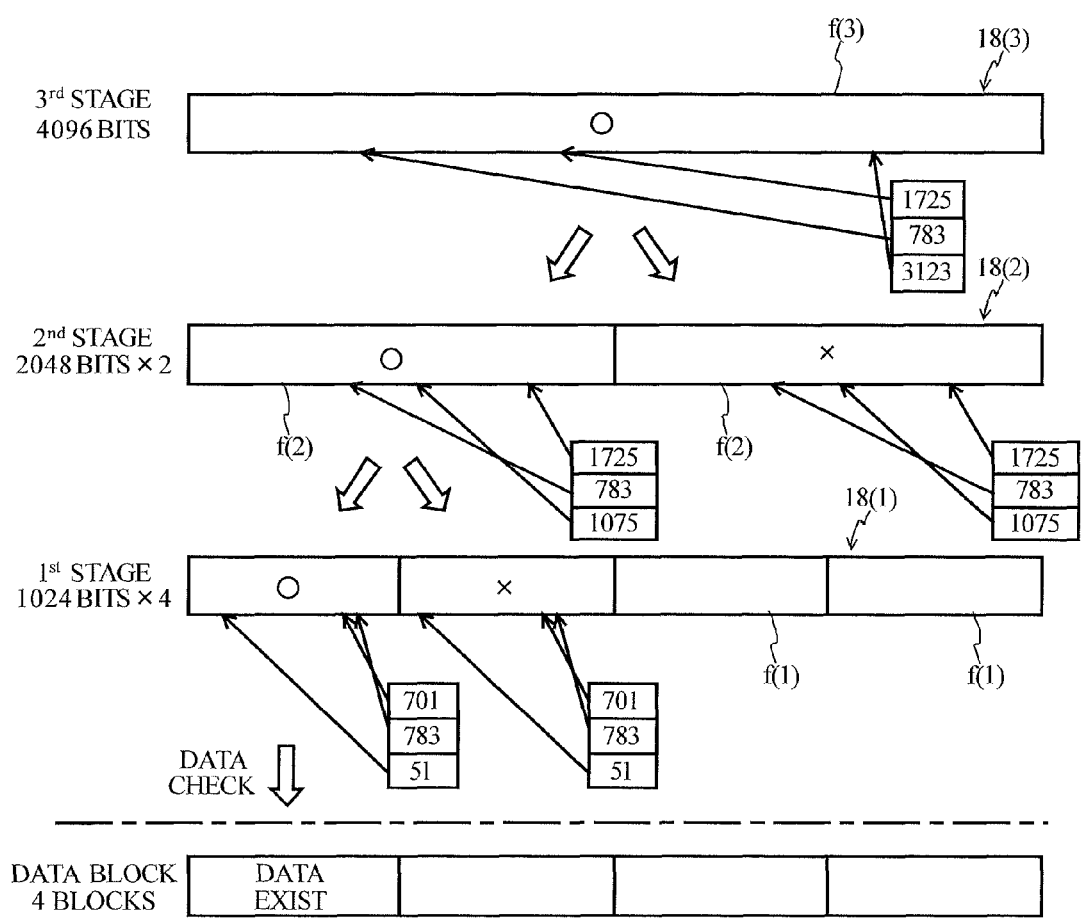
FIG. 9 is a diagram for explaining a process of a search of data.

In the step S49, the search unit 15 extracts a filter part where all of ith bit (i takes values of remainders) are ON. Here, assume that all of ith bit are ON in the filter part to be searched. In FIG. 9, the filter part to be searched where all of ith bit are ON is indicated with "o" mark, and the filter part to be searched where all of ith bit are not ON is indicated with "x" mark. The filter part indicated with "o" mark may be called a positive or tentatively positive filter part, and the filter part indicated with "x" mark may be called a negative filter part.

In the step S42, the search unit 15 determines whether there is an extracted filter part. When the determination of the step S42 is NO, the process moves to the step S56, and the search unit 15 determines that data to be searched is new data, which means that data to be searched is data not stored in the HDD 20, and ends the whole process in FIG. 7. On the other hand, when the determination of the step S42 is YES, the process moves to the step S44.

In the step S44, the search unit 15 determines whether p is 1. When the determination of the step S44 is NO, the process moves to the step S46. In the step S46, the search unit 15 sets filter parts of the (p−1)th stage corresponding to the extracted filter part as new filter parts to be searched. In the exemplary embodiment, both of two filter parts f(2) of the 2nd stage located right below the filter part f(3) of the 3rd stage are set as filter parts to be searched.

In the step S48, the search unit 15 decrements p by one (p<-p−1, here p<-2), and goes back to the step S38.

In the step S38, the search unit 15 carries out a checkup using k (three) hash values in filter parts of the pth stage (the 2nd stage) to be searched. In this checkup, the search unit 15 calculates remainders "1725", "783" and "1075" by dividing hash values by the bit number of the 2nd stage (2048), and determines whether 1725th, 783rd and 1075th bits are ON in filter parts f(2) to be searched. Then, in the step S40, the search unit 15 extracts the filter part where all of ith bit (i takes values of remainders) are ON. Here, assume that only the filter part f(2) at the left side of the Bloom Filter 18(2) at the second stage in FIG. 9 is extracted.

In the step S42, the search unit 15 determines whether there is an extracted filter part. When the determination of the step S42 is NO, the process moves to the step S56. When the determination of the step S42 is YES, the process moves to the step S44. In the step S44, the search unit 15 determines whether p is 1. When the determination of the step S44 is NO, the process moves to the step S46, and the search unit 15 sets filter parts of the (p−1)th stage corresponding to the extracted filter part as new filter parts to be searched. In this exemplary embodiment, two filter parts of the 1st stage located right below the filter part f(2) at the left end of the 2nd stage (the filter part f(1) at the left end and the filter part f(1) second from left) are set as filter parts to be searched.

In the step S48, the search unit 15 decrements p by one (p<-p−1, here p<-1), and goes back to the step S38. In the step S38, the search unit 15 carries out a checkup using k (three) hash values in filter parts to be searched of the pth stage (the 1st stage). In this checkup, the search unit 15 calculates remainders "701", "783" and "51" by dividing hash values by the bit number of the 1st stage (1024), and determines whether 701st, 783rd and 51st bits are ON in filter parts to be searched. In the step S40, the search unit 15 extracts the filter part where all of ith bit (i takes values of remainders) are ON. Here, assume that only the filter part at the left end of the Bloom Filter 18(1) at the 1st stage is extracted.

Then, in the step S42, the search unit 15 determines whether there is an extracted filter part. When the determination of the step S42 is NO, the process moves to the step S56, and when the determination of the step S42 is YES, the process moves to the step S44. In the step S44, the search unit 15 determines whether p is 1. When the determination of the step S44 is YES, the process moves to the step S50.

In the step S50, the search unit 15 reads out a disk block corresponding to the extracted filter part, and checks the presence of data. The reason for checking the presence of data in the step S52 is because there is a case that the tentatively positive may occur in the Bloom Filter and data does not exist in the data block corresponding to the extracted filter part. A description will be given later of a tentatively positive.

In the step S52, the search unit 15 determines whether data to be searched exists. When the determination of the step S52 is YES, it is determined that data to be searched is stored in the HDD 20 in the step S54, and the whole process in FIG. 7 is ended. On the other hand, when the determination of the step S52 is NO, the process goes back to the step S50, and in a case where a number of filter parts are extracted the search unit 15 reads out a disk block corresponding to the filter part other than the filter part checked previously and determines whether data to be searched exists.

The above description was given by using a case where the Bloom Filter has three stages and the number of disk blocks is four as an example, but the processes in FIG. 4 and FIG. 7 are executed regardless of the number of stages of the Bloom Filter, the number of disk blocks and the like.

A description will now be given of an effect caused by the tentatively positive of the Bloom Filter.

Figure 10:
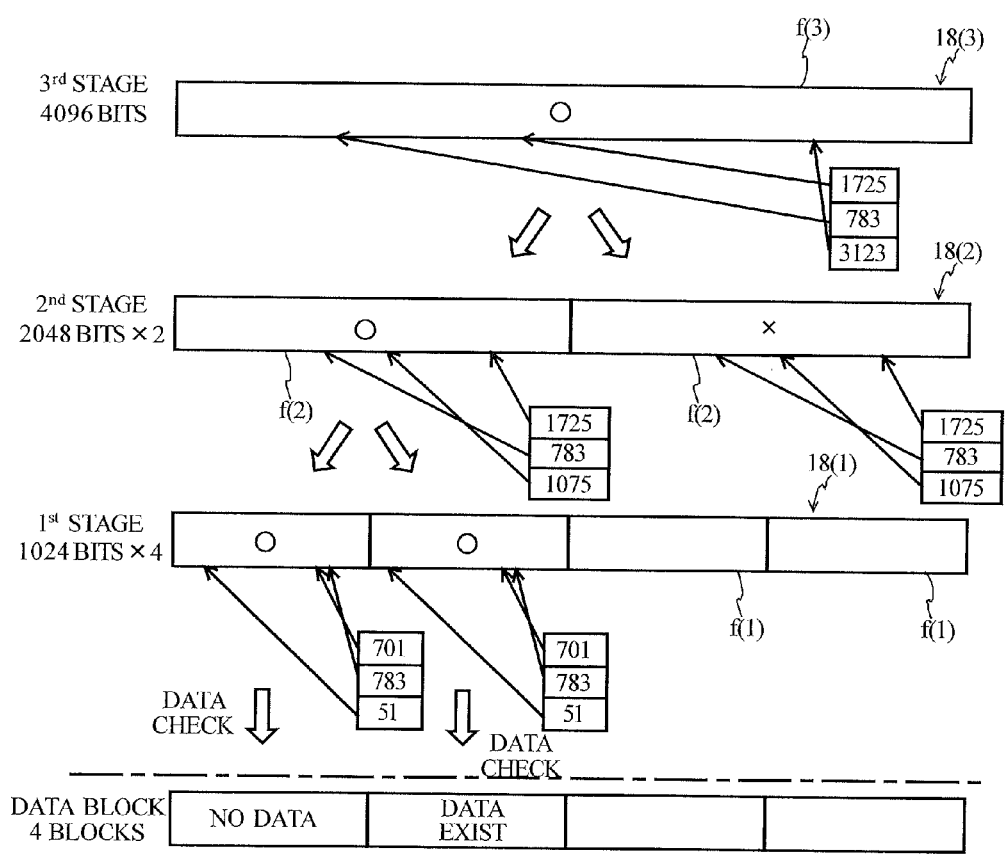
FIG. 10 is a diagram for explaining a process of a search of data.

The tentatively positive means a case that it is determined that data to be searched exists in the corresponding data block even though data to be searched does not exist as illustrated in the filter part at the left end of the Bloom Filter at the 1st stage in FIG. 10. In the Bloom Filter, there is a possibility of an occurrence of the tentatively positive.

The occurrence probability rate FPR of the tentatively positive of the Bloom Filter is expressed with a following formula (2) based on the property of the Bloom Filter when assuming that the number of entries is n (n<m) and the number of hash functions is k, in a case where the multistage Bloom Filter is an h-stage Bloom Filter and a bit length of the Bloom Filter at each stage is m.

$$FPR=(1-(1-1/m)^{kn})^k \approx (1-e^{(-kn/m)})^k \qquad (2)$$

In this case, it is possible to make FPR very small by changing k, m and n. That is to say that it is possible to set FPR to the value much smaller than 1 (almost 0) depending on the setting of k, m and n in this exemplary embodiment. Therefore, as it is possible to make the possibility that the determination of the step S52 in FIG. 7 becomes NO almost 0 (FPR=0), it becomes possible to keep the number of times of checking data in the step S50 down to almost one time (1+FPR).

In addition, as described above, as $x^{(h-1)}$ is equal to b, the height (the number of stages) h can be expressed by a following formula (3).

$$h=\log(b)/\log(x)+1 \qquad (3)$$

In the above description, it is supposed that log(b) is divisible by log(x), however, when log(b) is not divisible by log(x), it is possible to determine h by changing the value of x in each stage.

Here, it is necessary to carry out a checkup k times (k is the number of hash values and is a constant number), and the number of filter parts to be searched of one stage is x at a maximum. Therefore, the number of times of memory access M in searching is expressed by a following formula (4) at a maximum.

$$M=k\times x\times \log(b)/\log(x) \qquad (4)$$

That is to say that the height (the number of stages) h, which is equal to the amount of memory, can be made smaller by increasing x. On the other hand, as the number of times of search increases with an increase of x, there is a trade-off relationship between the height h and the number of times of search. Therefore, a proper operation of memory becomes possible by considering this relationship.

As described above, according to the exemplary embodiment, the memory 14 includes the multistage Bloom Filter 18, the 1st stage of the Bloom Filter is divided into filter parts f(1) of which the number is same as the number of data blocks, and the pth (p is an integer equal to or larger than 2) stage is divided into filter parts of which the size is the combination of multiple filter parts of the (p-1)th stage. In addition, the registration unit 13, which registers the entry of data to each stage of the multistage Bloom Filter by using the hash value of data generated by the hash generation unit 16, registers the entry of data in the filter part of the Bloom Filter at the 1st stage corresponding to data block where data is stored and registers the entry of data in the filter part of the Bloom Filter at the pth stage corresponding to the filter part of the Bloom Filter at the 1st stage in which the entry of the data is registered. Furthermore, the search unit 15 determines which of filter parts of the Bloom Filter at the 1st stage the entry of data to be searched is registered in by narrowing down filter parts from the filter part of the Bloom Filter of which the stage number is large. As described, in the exemplary embodiment, it becomes possible to make the number of times of access (I/O) to the HDD 20 for reading out data to be searched almost one time by registering the entry of data to the filter part of each stage of the multistage Bloom Filter corresponding to the data block where the data is stored. In addition, in the exemplary embodiment, it becomes possible to improve a memory efficiency because the number of stages h of the Bloom Filter can be changed in response to the size of the memory 14 regardless of the bit length of managed data (for example, 160 bits). Moreover, as the structure of the Bloom Filter is not changed by the addition of the entry, it is possible to add the entry easily.

Figure 11:
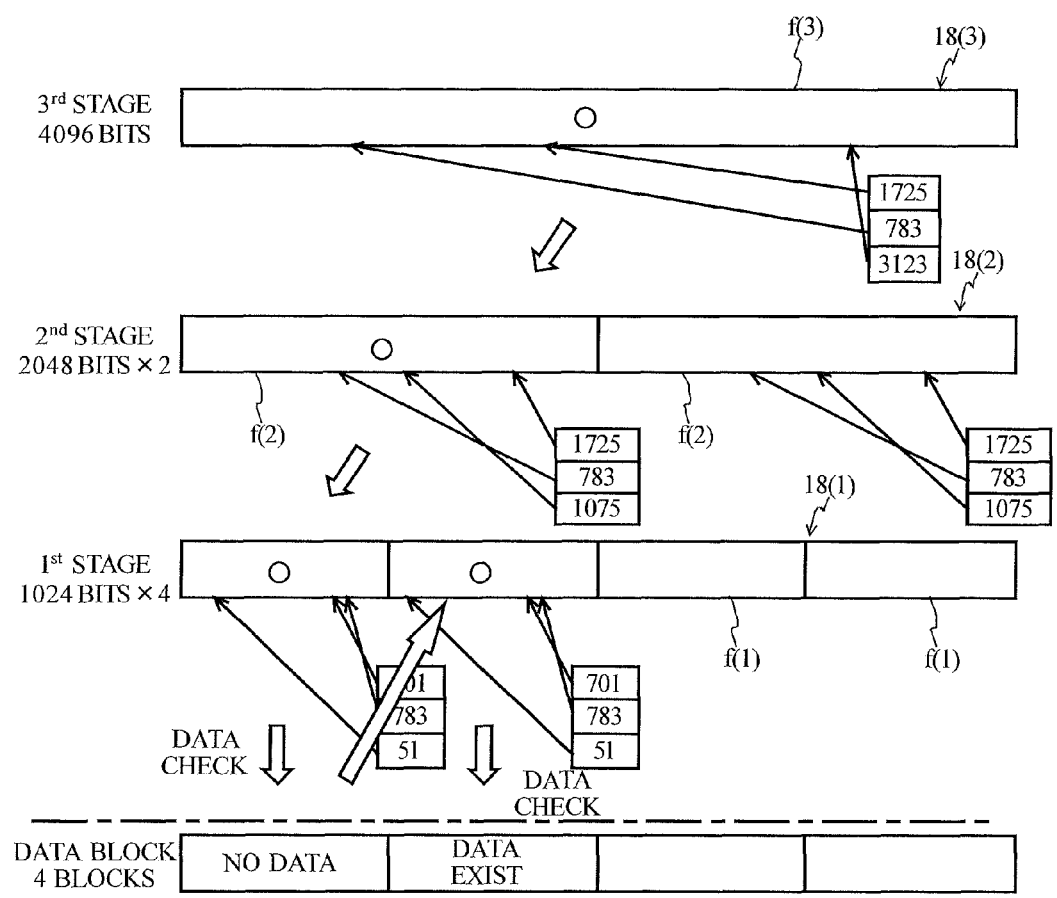
FIG. 11 is a diagram illustrating a variant process of a search of data.

In the above exemplary embodiment, as illustrated in FIG. 10, a description was given of a case where the check of data block is carried out after extracting all the data blocks having a possibility of the presence of data to be searched in a case where there are a number of data blocks having a possibility of the presence of data to be searched. However, the exemplary embodiment does not limit the present invention, and as illustrated in FIG. 11, the check of the data block may be carried out just after the data block having a possibility of the presence of data to be searched is extracted for example. In this case, the check of next data may be carried out only in a case where it is determined that the data does not exist in the checked data block. Accordingly, it becomes possible to improve the efficiency of data check.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various change, substitutions, and alterations could be made hereto without departing from the spirit and scope of the invention.

What is claimed is:

1. A data management device using a multi-stage Bloom filter comprising:
   a storage unit that includes a number of data blocks and stores data on at least one of the data blocks;
   a hash generation unit that generates a hash value of the data;
   a memory that includes the multi-stage Bloom filter, wherein the multi-stage Bloom filter is a data structure that is used to test whether a particular entry belongs to an existing set efficiently, a first stage of the multi-stage Bloom filter being divided into filter parts of which size is equivalent to the number of the data blocks, and a $p^{th}$ stage (p is an integer equal to or larger than 2) being divided into filter parts of which size is a combination of filter parts of a $(p-1)^{th}$ stage;

a registration unit that registers an entry of the data in each stage of the multi-stage Bloom filter by using the hash value of the data; and a search unit that determines whether an entry of data being searched is registered in each filter part of the multi-stage Bloom filter by using a hash value of the data being searched generated by the hash generation unit; wherein the registration unit registers the entry of the data in a filter part of the multi-stage Bloom filter at the first stage corresponding to a data block where the data is stored, and registers the entry of the data in a filter part of the multi-stage Bloom filter at the $p^{th}$ stage corresponding to the filter part of the multi-stage Bloom filter at the first stage in which the entry of the data is registered, and the search unit determines which filter part of the multi-stage Bloom filter at the first stage the entry of the data being searched is registered in by narrowing down filter parts from a start stage to an end stage of the multi-stage Bloom filter, wherein a stage number of the start stage being larger than a stage number of the end stage.

2. A computerized data management method using a multi-stage Bloom filter stored in a memory comprising:

storing data to at least one of data blocks included in a storage unit;

generating a hash value of the data;

registering an entry of the data in the multi-stage Bloom filter at a first stage and at a $p^{th}$ stage (p is an integer equal to or larger than 2) using the hash value, wherein the multi-stage Bloom filter is a data structure that is used to test whether a particular entry belongs to an existing set efficiently, the first stage of the multi-stage Bloom filter being divided into filter parts of which size is equivalent to a number of the data blocks, the $p^{th}$ stage of the multi-stage Bloom filter being divided into filter parts of which size is a combination of filter parts of $(p-1)^{th}$ stage; and determining whether an entry of data being searched is registered in the multi-stage Bloom filter based on a hash value of the data being searched; wherein the entry of the data is registered in a filter part of the multi-stage Bloom filter at the first stage corresponding to a data block where the data is stored, and the entry of the data is registered in a filter part of the multi-stage Bloom filter at the $p^{th}$ stage corresponding to the filter part of the multi-stage Bloom filter at the first stage where the entry of the data is registered, and it is determined which filter part of the multi-stage Bloom filter at the first stage the entry of the data being searched is registered in by narrowing down filter parts from a start stage to an end stage of the multi-stage Bloom filter, wherein a stage number of the start stage being larger than a stage number of the end stage.

* * * * *

UNITED STATES PATENT AND TRADEMARK OFFICE
CERTIFICATE OF CORRECTION

PATENT NO. : 8,255,406 B2
APPLICATION NO. : 13/028409
DATED : August 28, 2012
INVENTOR(S) : Yoshihiro Tsuchiya et al.

Page 1 of 1

It is certified that error appears in the above-identified patent and that said Letters Patent is hereby corrected as shown below:

Title Page, Item (54) and Column 1, Line 1 (Title), Delete "MULTI-STATE" and insert -- MULTI-STAGE --, therefor.

Signed and Sealed this
Twentieth Day of November, 2012

David J. Kappos
*Director of the United States Patent and Trademark Office*